United States Patent
Campos et al.

(10) Patent No.: US 10,693,559 B2
(45) Date of Patent: Jun. 23, 2020

(54) SYSTEM AND METHODS FOR CENTRALIZED NETWORK NODE DIGITIZATION

(71) Applicant: CABLE TELEVISION LABORATORIES, INC., Louisville, CO (US)

(72) Inventors: Luis Alberto Campos, Superior, CO (US); Zhensheng Jia, Superior, CO (US); Joseph Padden, Boulder, CO (US)

(73) Assignee: Cable Television Laboratories, Inc, Louisville, CO (US)

( * ) Notice: Subject to any disclaimer, the term of this patent is extended or adjusted under 35 U.S.C. 154(b) by 0 days.

(21) Appl. No.: 16/153,481

(22) Filed: Oct. 5, 2018

(65) Prior Publication Data

US 2019/0109643 A1 Apr. 11, 2019

Related U.S. Application Data

(60) Provisional application No. 62/568,642, filed on Oct. 5, 2017.

(51) Int. Cl.
| | |
|---|---|
| *H04J 14/00* | (2006.01) |
| *H04B 10/25* | (2013.01) |
| *H04J 14/02* | (2006.01) |
| *H04L 29/06* | (2006.01) |
| *H04Q 11/00* | (2006.01) |
| *H04B 10/2575* | (2013.01) |
| *H04B 10/27* | (2013.01) |
| *H04L 29/08* | (2006.01) |

(52) U.S. Cl.
CPC ......... *H04B 10/25* (2013.01); *H04B 10/2575* (2013.01); *H04B 10/27* (2013.01); *H04J 14/02* (2013.01); *H04L 69/18* (2013.01); *H04Q 11/0067* (2013.01); *H04Q 11/0071* (2013.01); *H04L 69/324* (2013.01)

(58) Field of Classification Search
CPC .......... H04B 10/2575; H04B 10/25753; H04B 10/25752; H04B 10/25758; H04J 14/02; H04J 14/0278; H04W 72/0453; H04W 88/085; H04Q 11/0066
USPC ..... 398/66, 67, 68, 69, 70, 72, 79, 115, 116, 398/117, 158, 159, 45, 48, 49
See application file for complete search history.

(56) References Cited

U.S. PATENT DOCUMENTS

| | | | |
|---|---|---|---|
| 2012/0148255 A1* | 6/2012 | Liu | H04B 10/50 398/136 |
| 2013/0343755 A1* | 12/2013 | Cvijetic | H04Q 11/0066 398/45 |
| 2018/0054823 A1* | 2/2018 | Stapleton | H04W 36/06 |

* cited by examiner

*Primary Examiner* — Hanh Phan
(74) *Attorney, Agent, or Firm* — Armstrong Teasdale LLP

(57) ABSTRACT

An access network includes a first local network node configured to serve one or more first client devices according to a first network protocol, a second local network node configured to serve one or more second client devices according to a second network protocol different than the first network protocol, and a hub in operable communication with the first and second local network nodes over respective transport media. The hub contains a centralized network node configured to generate a first digitized radio frequency (RF) stream to the first local network node and a second digitized RF stream to the second local network node. The first digitized RF stream corresponds to the first network protocol and the second digitized RF stream corresponds to the second network protocol.

20 Claims, 13 Drawing Sheets

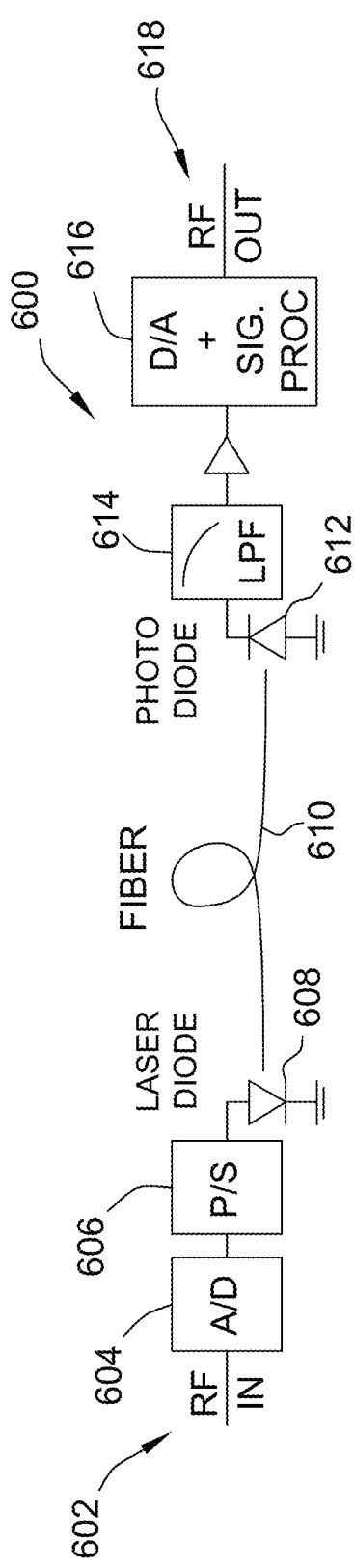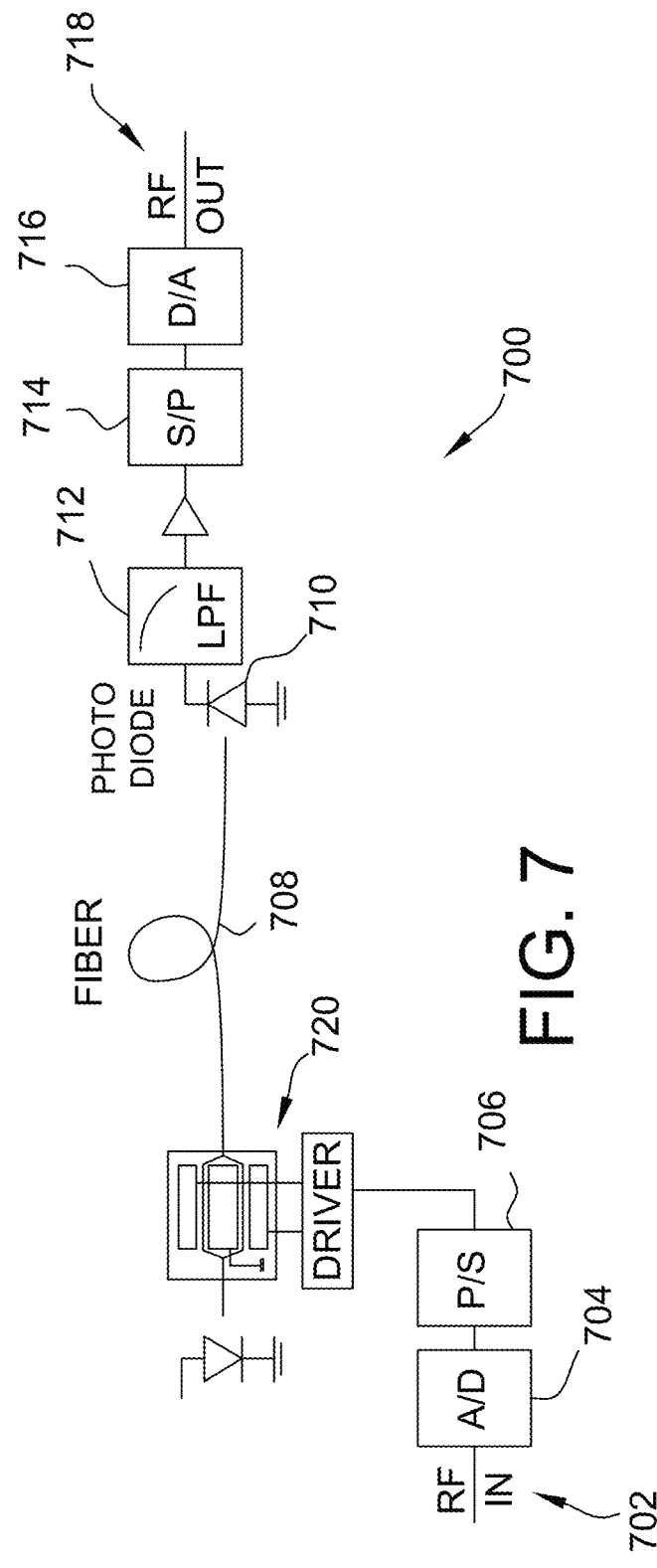
FIG. 6
FIG. 7

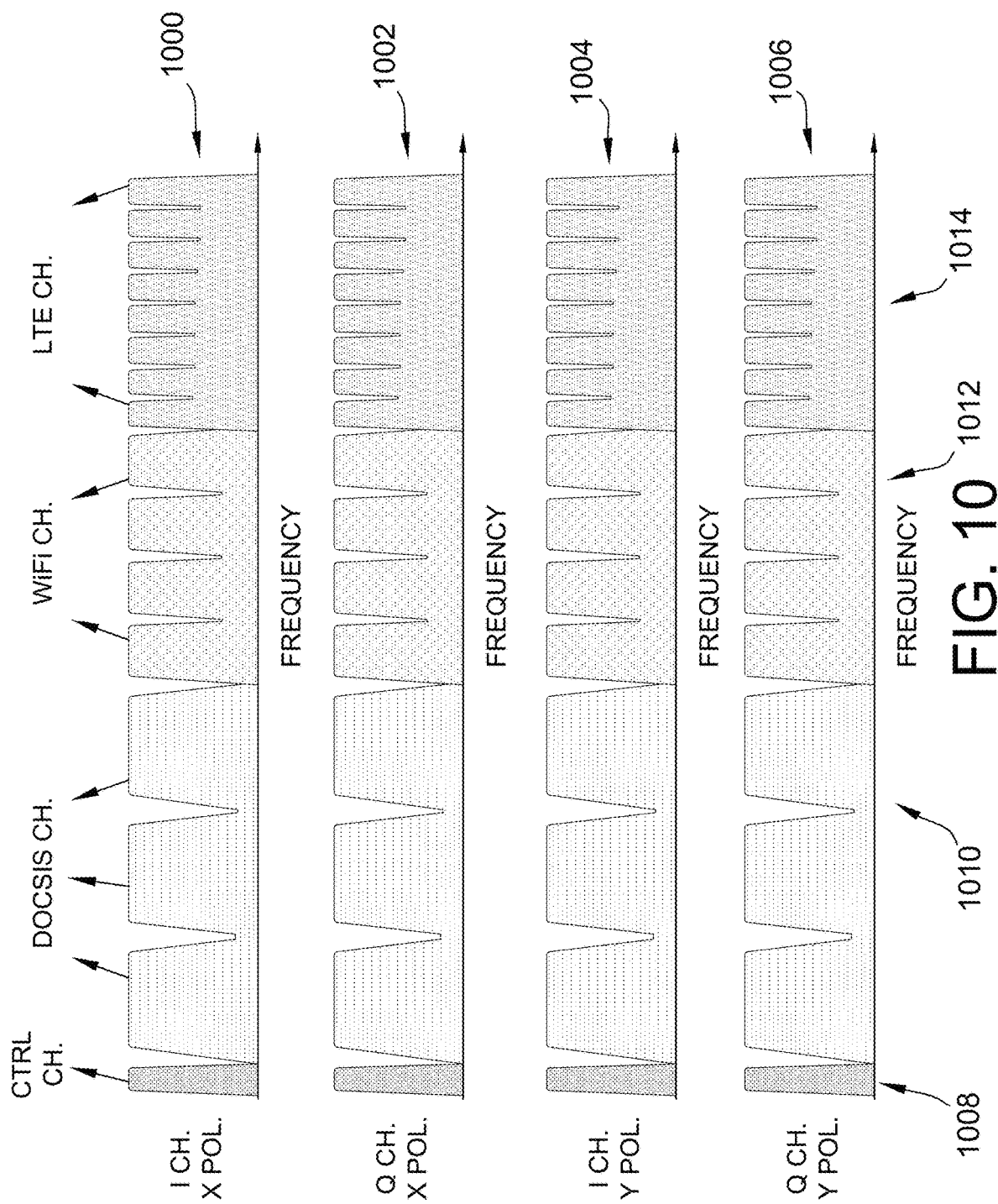

SYSTEM AND METHODS FOR CENTRALIZED NETWORK NODE DIGITIZATION

CROSS REFERENCE TO RELATED APPLICATIONS

This application claims the benefit of and priority to U.S. Provisional Patent Application Ser. No. 62/568,642, filed Oct. 5, 2017, which is incorporated herein by reference in its entirety.

BACKGROUND

The field of the disclosure relates generally to communication networks, and more particularly, to wired and wireless access networks capable of transporting signals according to one or more network protocols.

Telecommunications networks typically include an access network through which end user subscribers connect to a service provider. Some such networks are "wired," that is, utilize fiber-optic distribution infrastructures, coaxial cable transport means, or hybrid fiber-coaxial infrastructures (HFC). Some access networks transport signals wirelessly. Some access networks implement a combination of wired and wireless transport means. Bandwidth requirements for delivering high-speed data and video services through the access network, however, is rapidly increasing to meet growing consumer demands.

Conventional cable access networks utilize analog modulation to modulate the cable radio frequency (RF) spectrum onto optical carriers, as well as baseband digital modulation of optical carriers to support business services, and Ethernet passive optical networks (EPONs) and Gigabit passive optical networks (GPONs) systems to carry data for residential or business subscribers. In a typical conventional implementation, a network operator deploys local network nodes such as wired end-points, HFC fiber nodes, wireless access-points, or micro-cells, which are capable of generating signals using a specified network protocol and a specified RF signal format that the eventual client devices can understand and use to communicate with the network. For the purposes of this discussion, the term "local" refers to the close proximity between the node and the respective client devices served by the node. In contrast, the central hub of the access network (e.g., where data aggregation occurs) is considered to be "remote" from the local network nodes (and client devices). A conventional access network implementation is described further below with respect to FIG. 1.

FIG. 1 is a schematic illustration of a conventional access network 100. In an exemplary embodiment, network 100 includes a central hub 102 and a plurality of local network nodes 104. Central hub 102, for example, may represent a centralized data aggregation unit. In this example, hub 102 connects with local network nodes 104 by a plurality of respective wired transport media 106. Wired transport media 106, for example, may include individual or bundled fiber optic strands. Each local network node is configured to serve one or more client devices (hereinafter, clients) 108. As illustrated in FIG. 1, local network nodes 104 are considered to be in near physical proximity to their respective clients 108, and are configured to backhaul traffic from clients 108 using different network protocols, over transport media 106, to central hub 102. Central hub is therefore considered "remote" in this example, from the perspective of local network nodes 104 and clients 108.

For conventional access network 100, clients 108 and local network nodes 104 are each designed to operate according to specific protocols and interfaces, but without the capability to flexibility change the format and/or protocols for which the clients and nodes were originally designed. To avoid these design limitations, several techniques have been proposed that utilize software defined networking (SDN) and software defined radio (SDR) technology to enable changes to the protocol and physical layer (PHY layer) characteristics of the transport system. SDRs, together with network function virtualization (NFV) allow network nodes to be re-programmed, depending on the provider and subscribers needs. That is, in some cases, a network node, on command or by an image upgrade, may have its characteristics and functionality changed.

However, local network nodes (i.e., nodes 104) at the edge of the network (i.e., network 100) handle significantly few subscribers than other nodes, as well as significantly more limited traffic. Accordingly, it is highly inefficient and costly to implement such software-based processing the local network node at the edge, in a self-contained manner, and still be capable of supporting all the respective network personalities and performance expected from the node. A more flexible and improved network configuration is therefore desirable.

BRIEF SUMMARY

In an embodiment, an access network includes a first local network node configured to serve one or more first client devices according to a first network protocol, a second local network node configured to serve one or more second client devices according to a second network protocol different than the first network protocol, and a hub in operable communication with the first and second local network nodes over respective transport media. The hub contains a centralized network node configured to generate a first digitized radio frequency (RF) stream to the first local network node and a second digitized RF stream to the second local network node. The first digitized RF stream corresponds to the first network protocol and the second digitized RF stream corresponds to the second network protocol.

In an embodiment, a network node is provided for an access communication network. The network node includes a network function virtualization layer, a media access control layer, a physical layer, a digitization layer, and a plurality of digital optical interfaces in operable communication with a plurality of optical fibers of the access communication network. The network node is configured to generate digitized RF signal streams for transport over the plurality of optical fibers to a respective plurality of distributed nodes each disposed proximate to one or more subscribers of the access communication network.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 6 is a schematic illustration of a non-coherent optical link utilizing direct modulation, in accordance with an embodiment of the present disclosure.

FIG. 7 is a schematic illustration of a non-coherent optical link utilizing external modulation, in accordance with an embodiment of the present disclosure.

FIG. 10 is a graphical illustration depicting simultaneous transport of data streams generated according to the coherent optical link depicted in FIGS. 9A-C.

Figure 1:
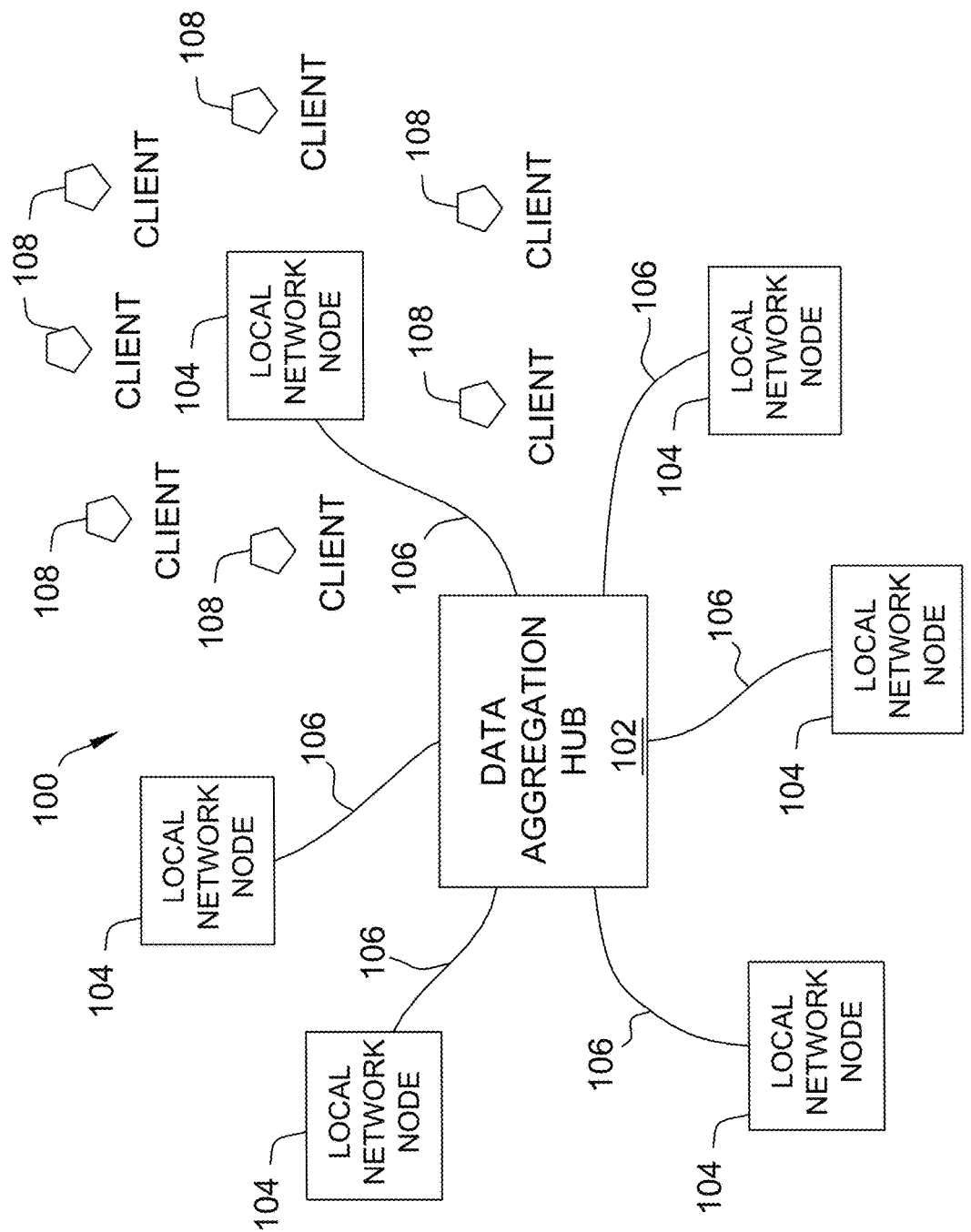
FIG. 1 is a schematic illustration of a conventional access network.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

According to the embodiments herein, an SDN node is advantageously capable of supporting diverse RF interfaces such as Data Over Cable Service Interface Specification (DOCSIS), Long Term Evolution (LTE), 4G, 5G, centrally controlled Wi-Fi, LoRa, and other RF network systems from a centralized location. This centralized node is sometimes referred to herein as a "chameleon node," which may cooperatively operate with corresponding local and other remote network nodes that regenerate RF signals, such that a more flexible, adaptable, and agile multi-format/multi-function system is obtained. The innovative chameleon node embodiments herein may further advantageously leverage, in a scalable fashion, SDR, software defined MAC layers, various Split Architectures (e.g., MAC-PHY splits, slit PHY layer, split MAC), Network Function Virtualization (NFV), and virtual network functions (VNF), to implement the different networking personalities supported by the node.

In an exemplary embodiment, innovative RF digitization techniques are implemented to remotely convey the network functions to a local/remote network node where the desired RF signal is reconstructed. The present centralized chameleon node is significantly more agile than conventional access node configurations with respect to the ability to adapt to the type of digitized RF signal to be delivered by the node. The chameleon node of the present systems and methods is further able to utilize local/remote network nodes as part of the RF signal reconstruction process. In addition to generating RF band(s), the chameleon node is further capable of decoding control information and parameters, such as the center frequency used for each respective signal band, the coaxial and/or antenna feed through which the RF signal band is delivered, and other transport parameters (e.g., amplitude, delay, phase, etc.).

The network node embodiments described herein are of particular use with respect to SDR, VNF, and NFV implementations, in that the present chameleon nodes may be more flexibly re-programmed to function as universal network nodes (e.g., depending on the provider and subscribers needs). For example, the present chameleon node might initially function as a Wi-Fi AP or portion(s) of a Wi-Fi AP, but subsequently an LTE base station or portion(s) of and LTE base station (e.g., assuming the character of the base station) when the needs of the system change. As described further below, this functionality may be defined within the software architecture of the node, and therefore be more able to flexibly change as desired. In an exemplary embodiment, one portion of the node is dedicated to support one protocol and transport format, while another portion of the node is configured to support a different protocol and transmission format.

As described above, local nodes at the edge of the network handle few subscribers and limited traffic, and are thus inefficient and costly vehicles in which to contain the processing functionality described herein. The present systems and methods avoid this inefficiency and these costs by centralizing "chameleon" functionality at a central, remote node, which is then available to serve all local nodes within the service area of the access network. At this central location, for example, the number of subscribers will be greater, a larger amount of traffic will be seen, and a greater diversity of network personalities is expected. Accordingly, in some embodiments the central chameleon node functions to serve local clients/subscribers remotely, but in a manner (from the client/subscriber perspective) that appears substantially the same as being served by the nearby conventional local network node.

According to some embodiments, the RF signal received by the client from the local network node may actually originate from the centralized network node (and may be also generated thereby), but transported to the local network node through a digital link that carries the digitized RF that corresponds to the local network node. This functionality is described further below with respect to FIG. 2.

Figure 2:
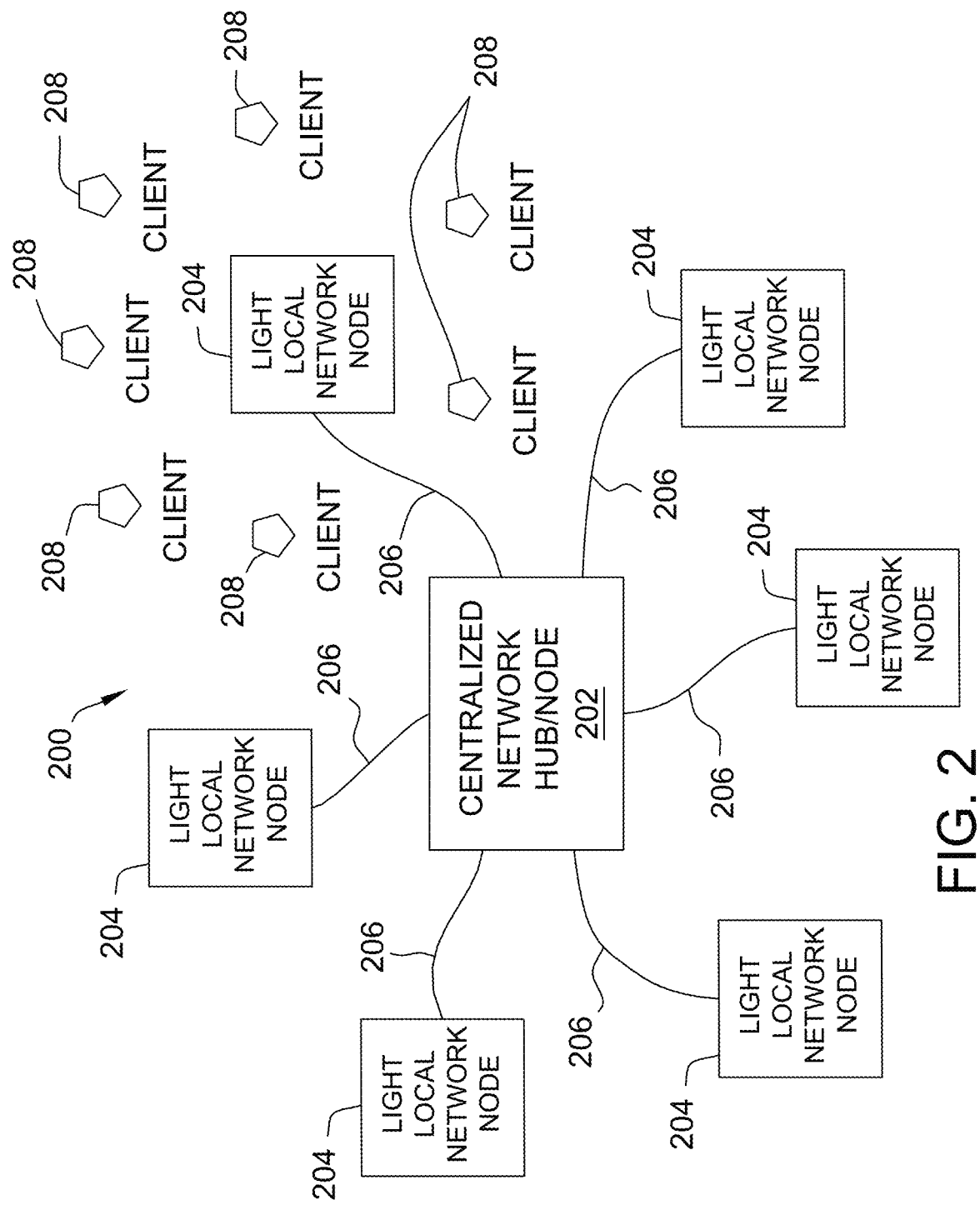
FIG. 2 is a schematic illustration of an access network, in accordance with an embodiment of the present disclosure.

FIG. 2 is a schematic illustration of an access network 200. Network 200 is structurally similar to conventional network 100, FIG. 1, in several respects, but differs with respect to the functionality of the similar hardware elements. For example, in an exemplary embodiment, network 200 includes a central hub 202, a plurality of "light" local network nodes 204, transport media 206, and clients 208. That is, network 200 exhibits a substantially similar topology as network 100, except that many of the functions that would have been performed at the edge of network 100, or at local network nodes 104, are instead, in network 200, advantageously performed at the centralized, remote location of hub 202. In this example, because many of the described functions are performed only at the centralized location and not at the local network node level, nodes 204 are referred to as "light" local network nodes (i.e., light duty operation).

In an exemplary embodiment of network 200, RF signal generation also originates at the central location of hub 202. More particularly, the RF signals received by clients 208 from light local remote nodes 204 are initially digitized at a centralized network node (not shown in FIG. 2, described further below with respect to FIG. 3) of hub 202, and then transported to light local network nodes 208 over transport media 206 (e.g., fiber, or another transport medium suitable to carry the digital stream with the RF digitized signal).

Figure 3:
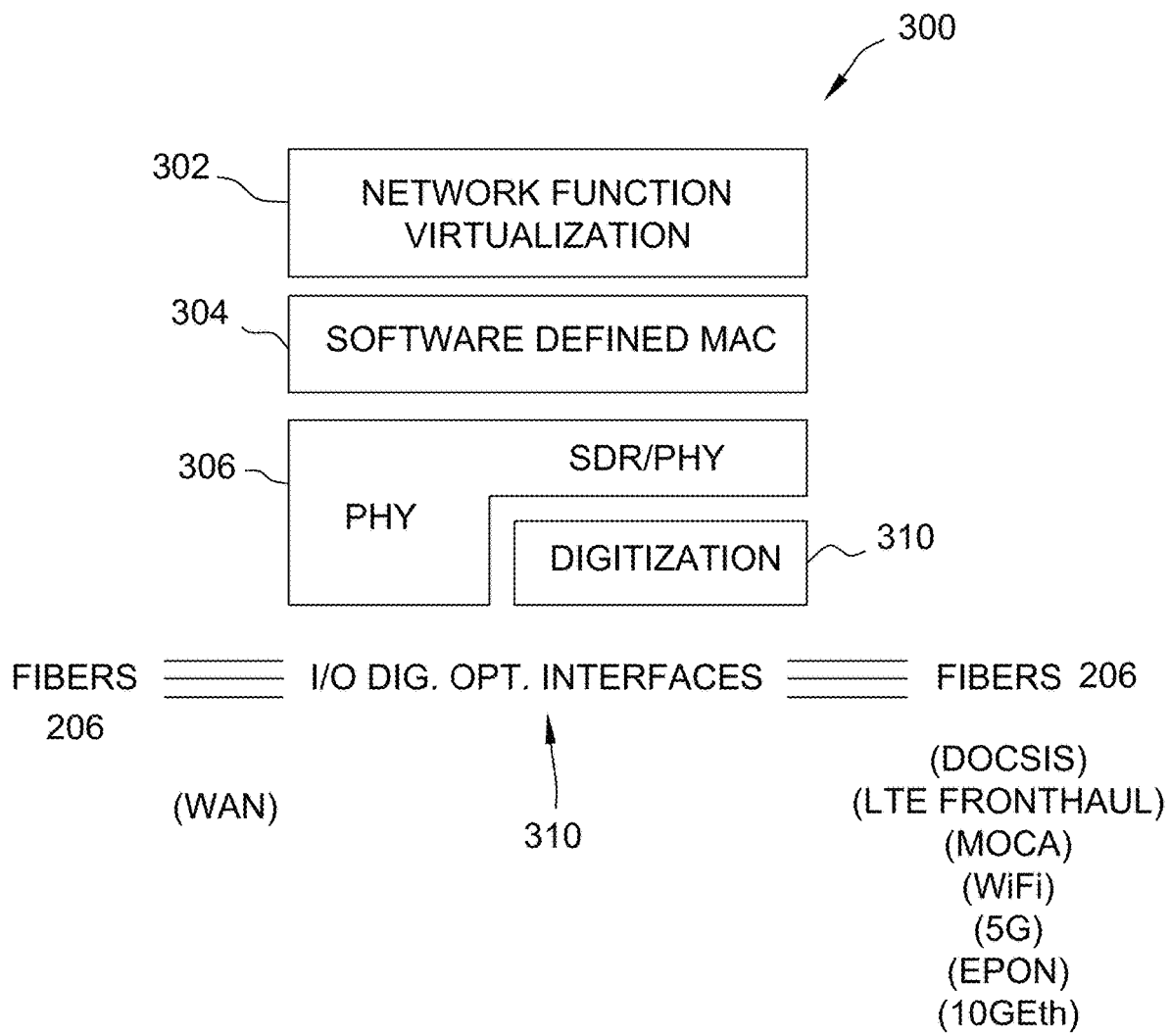
FIG. 3 is a schematic illustration of a centralized node architecture, in accordance with an embodiment of the present disclosure.

FIG. 3 is a schematic illustration of a centralized node architecture 300. In an exemplary embodiment, architecture 300 represents the distribution of communication layers of a centralized chameleon node, which functions as a universal node where a diversity of network protocols are implemented. Architecture 300 may include, for example, an NFV layer 302 and MAC layer 304, a PHY layer 306, and a digitization layer 308. MAC layer 304 may be a software-defined MAC layer, and PHY layer 306 may be implemented using SDR technology (e.g., an SDR/PHY layer), which is particularly useful with respect to PHY layers including DOCSIS, LTE, Wi-Fi (and other IEEE 802.11 protocols), Multimedia over Coax Alliance (MoCA), 3G, 4G, 5G (and other 3GPP protocols), and other technologies utilizing RF signals.

In the exemplary embodiment, architecture 300 is configured to leverage, through software, SDN layers to implement MAC layer 304. Architecture 300 may be further configured such that the software leverages upper layer protocols as well. In exemplary operation, the RF signals are digitized and transmitted over fibers 206. Within architecture 300, and RF signal may be generated, and also up-converted or down-converted if desired. Up-converted signals may, for example, be delivered through coaxial cable interfaces or, in the case of wireless protocols, through an antenna. Architecture 300 is in operable communication with fibers 206 through one or more input/output digital optical interfaces 310. Interfaces 310 are physical interfaces, and may be configured to support networking protocols that use baseband signals (e.g., a WAN), in which case architecture 300 need not leverage the SDR portion of the network node (e.g., no RF digitization is needed), which may be particularly advantageous with the use of network communication protocols such as EPON and Gigabit Ethernet (10 GEth).

Figure 4:
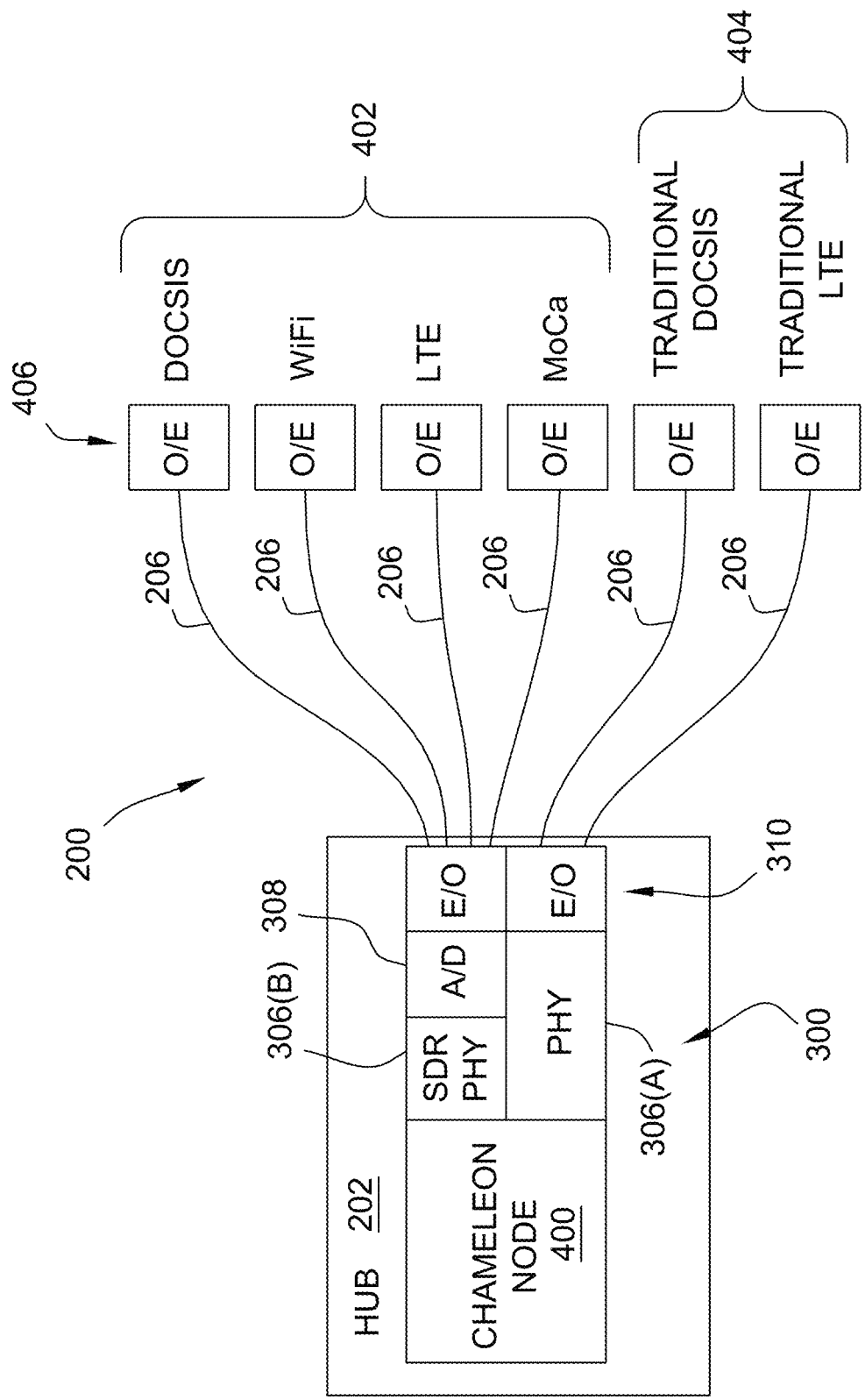
FIG. 4 is a schematic illustration of a chameleon node implemented within the access network depicted in FIG. 2, according to centralized node architecture depicted in FIG. 3.

FIG. 4 is a schematic illustration of a chameleon node 400 implemented within access network 200, FIG. 2, according to centralized node architecture 300, FIG. 3. In the exemplary embodiment, node 400 is configured to serve a plurality of different network protocols 402 (e.g., DOCSIS, LTE, 3G, 4G, 5G, MoCA, Wi-Fi, LoRa, etc.) and 404 (e.g., "traditional" DOCSIS, "traditional" LTE, etc.). Network protocols 402 are, for example, transported through RF digitization, whereas network protocols 404 may be transported in the "traditional" fashion, that is, non-digitized. In the exemplary embodiment, chameleon node 400 is sufficiently versatile to serve both digitized and non-digitized transport for various communication protocols.

In the exemplary embodiment, digitization layer 308 includes an analog-to-digital (A/D) converter, and interfaces 310 are electrical-to-optical (E/O) interfaces. Accordingly, access network 200 is further configured to include a plurality of optical-to-electrical (O/E) interfaces 406 downstream of transport media 206 for each of the several implemented protocols 402, 404.

In some the embodiments, access network 200 includes additional protocol and system modifications to adjust for the round trip time delay that may be experienced over the fiber link of transport media 206. For example, many Wi-Fi protocols utilize CSMA/CA "listen before talk" (LBT) processes that typically require quick access to the channel from client devices. Implementation of an access environment according to FIG. 4 might be expected to introduce a delay up to 150 μs. Nevertheless, such additional delay may be significantly mitigated by the ongoing evolution of Wi-Fi protocols toward scheduled MAC. In another example, MoCA similarly relies on CSMA/CA process, which is delay sensitive. However, the delay may be mitigated for this protocol as well along similar lines, namely, through introduction of a scheduled approach. Since MoCA operates within a contained cable environment, delay challenges may also be overcome by mechanisms to separate the downstream and upstream transmissions on separate respective channels.

Figure 5:
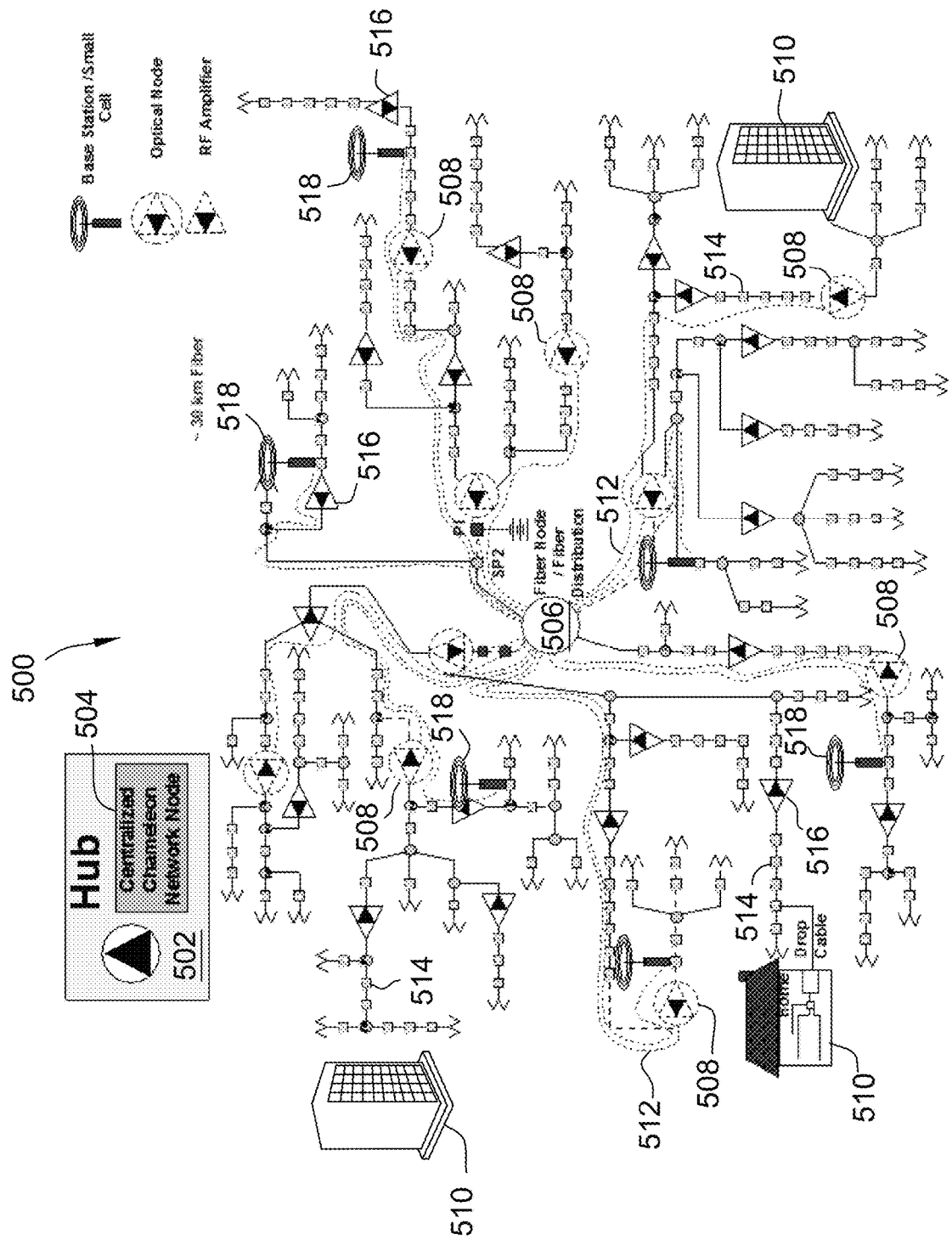
FIG. 5 is a schematic illustration of an exemplary fiber communication system implementing the principles described with respect to FIGS. 2, 3, and 4.

FIG. 5 is a schematic illustration of an exemplary fiber communication system 500, implementing the principles described with respect to FIGS. 2, 3, and 4. System 500 includes an optical hub 502 (or headend), which operates as a particular aggregation center for system 500, and may represent a central office or a communications hub, and include an optical line terminal (OLT) or modem termination system (MTS). In the exemplary embodiment, hub 502 further includes a centralized chameleon network node 504, similar to chameleon node 400, FIG. 4. Communication system 500 may, for example, represent a cable network environment serving DOCSIS, LTE, MoCA, Wi-Fi, etc. Communication system 500 may additionally, or alternatively, represent a cellular environment. In an exemplary embodiment, hub 502 further serves as a location where substantially all RF signals are generated by the MTS/OLT and/or edge QAMs (E-QAMs, not shown in FIG. 5).

System 500 may further include a remote node 506, which may be a fiber node or a fiber distribution center for system 500, local nodes 508, and end users/clients 510. End users/clients 510 may include one or more downstream termination units (not shown in FIG. 5), which may represent, for example, a customer device (e.g., a modem) or customer premises (e.g., a home, apartment building, residential radio frequency over glass (RFoG) subscribers, etc.), a business user (including point-to-multipoint fiber networks with business EPON subscribers), an optical network unit, or a cellular base station (including small cell base stations). In an exemplary embodiment, system 500 utilizes a passive optical network (PON) and coherent Dense Wavelength Division Multiplexing (DWDM) PON architecture.

Optical hub 502 may communicate with remote node 506 by way of a long fiber (not shown in FIG. 5), which may span a distance of at least 30 kilometers (km) in length, but may be significantly longer. Remote node 506 may connect with end users/clients 510 through transport media 512 or coaxial cables 514, and intervening local nodes 508. Signal power over coaxial cable 514 may be boosted by amplifiers 516 located along the cable path. In an embodiment, transport media 512 may span a distance of less than 5000 feet.

According to the exemplary embodiment depicted in FIG. 5, an HFC network may evolve to support a fiber deep architecture into which the present centralized chameleon node embodiments may be advantageously implemented. In at least one embodiment, chameleon node 504 is configured, within hub 502, to digitize RF signals for transmission to HFC nodes, small cells, Wi-Fi APs, remote radio units (RRUs), and MoCA nodes including the various virtualizations and splits of such devices. In a cellular environment, the fiber network further connects with a plurality of base stations 518. The chameleon node embodiments of the present condition are particularly compatible with cellular networks implementing a centralized radio access network (C-RAN) architecture. Furthermore, within the cellular environment, there may be no need to support the DOCSIS protocol, and in some cases, the MoCA protocol as well. The centralized chameleon node embodiments described herein are therefore more flexibly able to facilitate the implementation of simplified dual Wi-Fi/LTE cells. The centralized chameleon node architecture still further enables coordinated multipoint (CoMP) transmission, as well as other cellular applications that require synchronization and coordination.

In some embodiments, system 500 is further configured to utilize wavelength filtering and injection locking techniques, which are also described in greater detail in co-pending U.S. patent application Ser. No. 15/283,632, incorporated herein by reference.

The following embodiments describe alternative, and in some cases complementary, embodiments for transmitting a digitized signal. For ease of explanation, the following description focuses on non-coherent and coherent optical transport schemes. The selection of a particular scheme may, for example, depend on factors such as the capacity and distance that needs to be supported.

FIG. 6 is a schematic illustration of a non-coherent optical link 600 utilizing direct modulation. In an exemplary embodiment, optical link 600 receives input RF signals 602 at an A/D converter 604, which digitizes RF signals 602 and then processes the digitized signals through a parallel-to-serial (P/S) converter 606 before modulating the digitized signals over a laser 608 (e.g., a laser diode). The modulated signal is then transported over fiber 610, and received at photodiode receptor 610. The received signal may then be passed through a low pass filter 614, and may be the subject to further signal processing and conversion by a digital-to-analog (D/A) converter 616 before being output as an output RF signal 618 to a client/subscriber.

In exemplary operation of non-coherent optical link 600, and RF signal is digitized for transport over a non-coherent optical fiber link. Optical link 600 illustrates an example where the digitized transport is implemented using direct modulation. That is, in this configuration, the current of laser diode 608 may be directly modulated to generate a variation in optical intensity of the digitized signal transported over fiber 610 (an illustrative example of external modulation is described further below with respect to FIG. 7). More particularly, non-coherent optic link 600 is configured to carry a digitized RF signal, and digitization of input RF signal 602 occurs within the block of A/D converter 604.

In some embodiments, digitization of input RF signal 602 may further utilize Nyquist sampling. In other (or additional) embodiments, digitization is performed using delta-sigma modulation. Exemplary delta-sigma modulation techniques are described in greater detail in co-pending U.S. patent application Ser. No. 15/847,417, filed Dec. 19, 2017, U.S. patent application Ser. No. 15/847,535, filed Dec. 19, 2017, and U.S. patent application Ser. No. 15/875,336, filed Jan. 19, 2018, the respective disclosures of which are incorporated by reference herein.

FIG. 7 is a schematic illustration of a non-coherent optical link 700 utilizing external modulation. Optical link 700 is similar to optical link 600, FIG. 6, and includes several components that are substantially similar to those described above with respect to optical link 600. For example, for an input RF signal 702, optical link 700 includes an A/D converter 704, a parallel-to-serial converter 706, an optical fiber 708, a photodiode receptor 710, a low pass filter 712, a serial-to-parallel converter 714 and a D/A converter 716 that outputs output RF signal 718. Instead of the laser diode (e.g., laser diode 608) of optical link 600 though, optical link 700 implements an external modulator 720 (e.g., a dual-drive Mach Zehnder modulator (MZM)). More particularly, in exemplary operation of optical link 700, the digitized RF signal (i.e., from A/D converter 704 or parallel-to-serial converter 706) drives external modulator 720 such that modulator 720 intensity-modulates light past therethrough for transport of long fiber 708. An external modulator may be particularly useful, for example, in the case where higher modulation rates are desired.

In other embodiments, digital transport of a digitized RF signal may also be accomplished using differential modulation schemes (not separately illustrated). In such differential modulation schemes, the RF signal is, after digitization, encoded such that information of a previous symbol may be used as a phase reference to detect a present symbol of the received signal. Accordingly, the non-coherent optical links described above are provided by way of illustration, and are not intended to be limiting. The present centralized node embodiments are additionally applicable to other types of non-coherent digitized transport.

Figure 8:
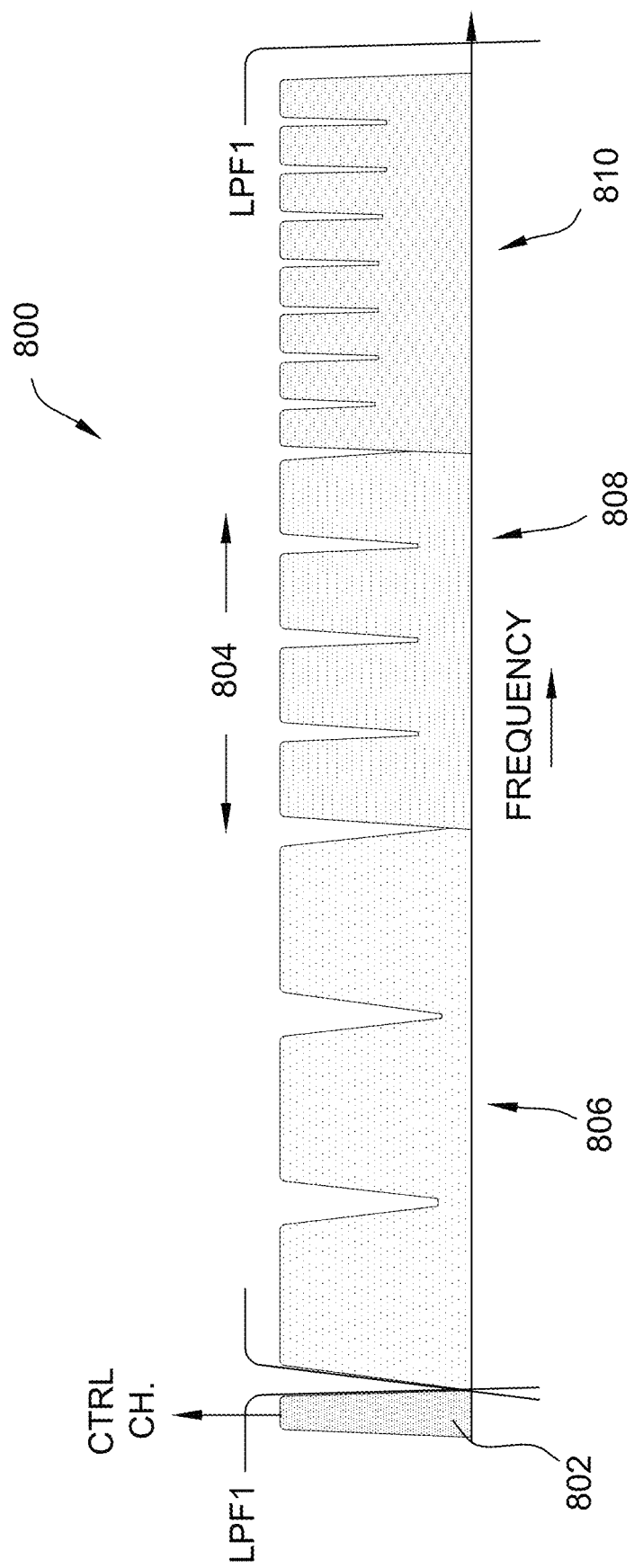
FIG. 8 is a graphical illustration depicting simultaneous transport of data streams generated according to the non-coherent optical link depicted in FIG. 6 or 7.

FIG. 8 is a graphical illustration depicting simultaneous transport of data streams 800 generated according to non-coherent optical link 600, FIG. 6, or non-coherent optical link 700, FIG. 7 (or other types of non-coherent digitized transport within the scope of the present application). In the exemplary embodiment illustrated in FIG. 8, data streams 800 generated according to a non-coherent optical link having simultaneous transport of one or more optical carriers of a different protocol, such as Wi-Fi, DOCSIS, LTE, etc.

In the exemplary embodiment, data streams 800 includes a control channel 802, and a set of frequency-multiplexed channels 804. In the exemplary embodiment illustrated in FIG. 8, set of channels 804 includes a first subset of channels 806, a second subset of channels 808, and a third subset of channels 810. That is, first subset 806 might represent a plurality of DOCSIS channels, whereas second subset 808 may represent a plurality of LTE channels, while third subset 810 might represent ⅓ system having a protocol that is neither DOCSIS nor LTE.

In at least one embodiment, control channel 802 is embedded within the signal that includes a set of channels 804. In another embodiment, control channel 802 (i.e., the control signal) is not embedded within the payload transport of set of channels 804, such as in the case where it is desirable to keep the payload transport and the control signal independent from one another. This configuration may, for example, further facilitate the universal nature of the chameleon node, and an independent control channel 802 may further enable low latency implementation by avoiding unnecessary processing to extract control information from one of the payload channels upset 804. In some embodiments, control channel 802 contains information regarding frequency and port mapping, and may additionally contain reference timing information that may be leveraged by the different system protocols to coordinate and synchronize transport information. In an exemplary embodiment, control channel 802 is provided in a lower frequency band to further lower the cost of system implementation.

Figure 9A:
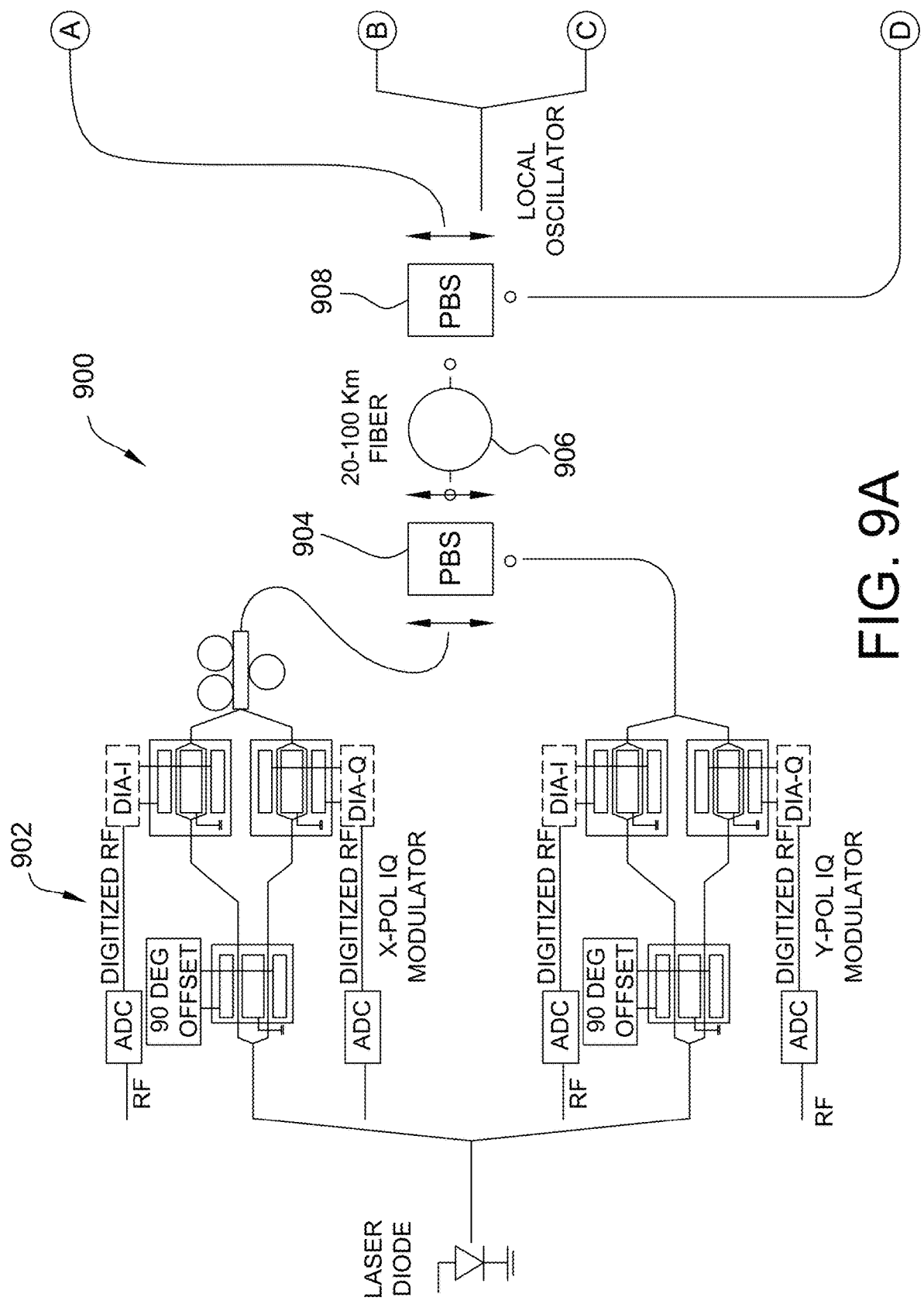
FIGS. 9A-C depict a schematic illustration of a coherent transmission system for an access network environment, in accordance with an embodiment of the present disclosure.
Figure 9B:
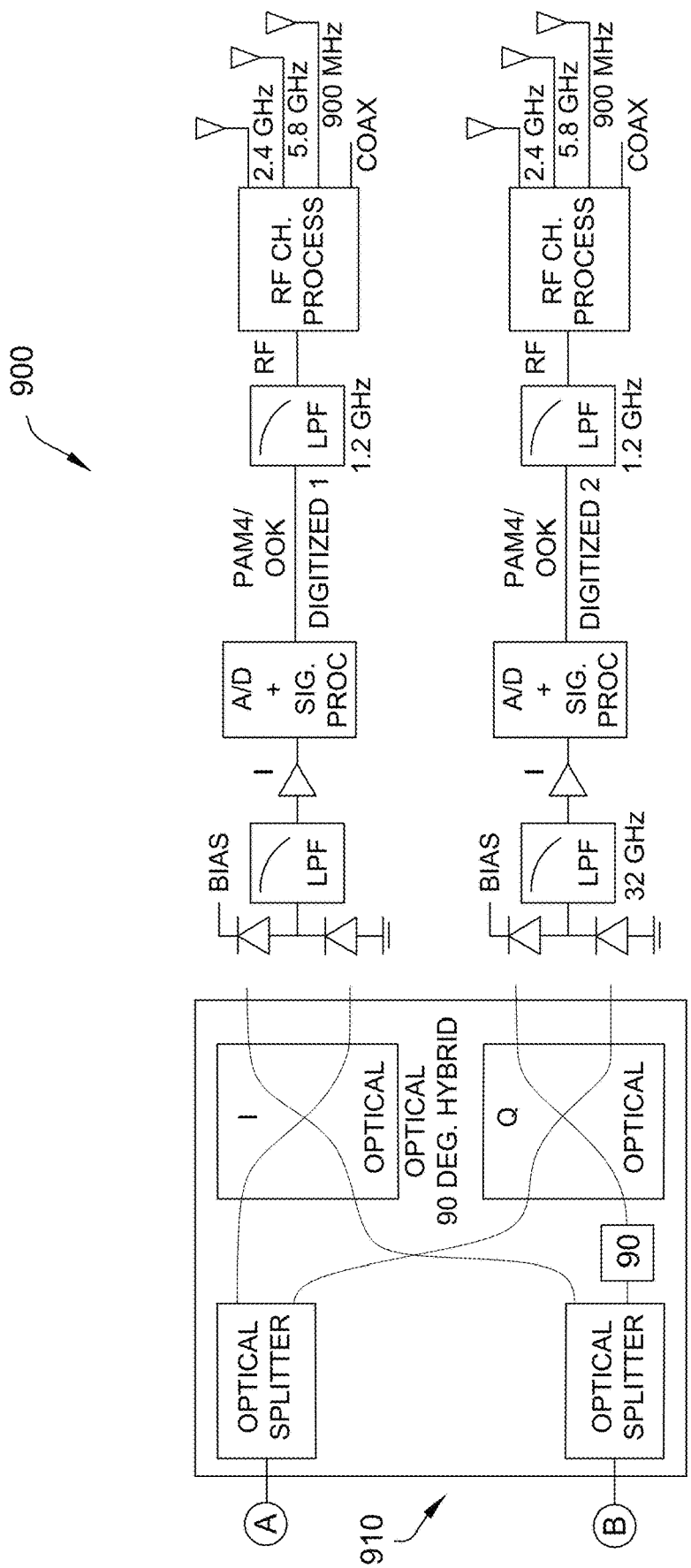
Figure 9C:
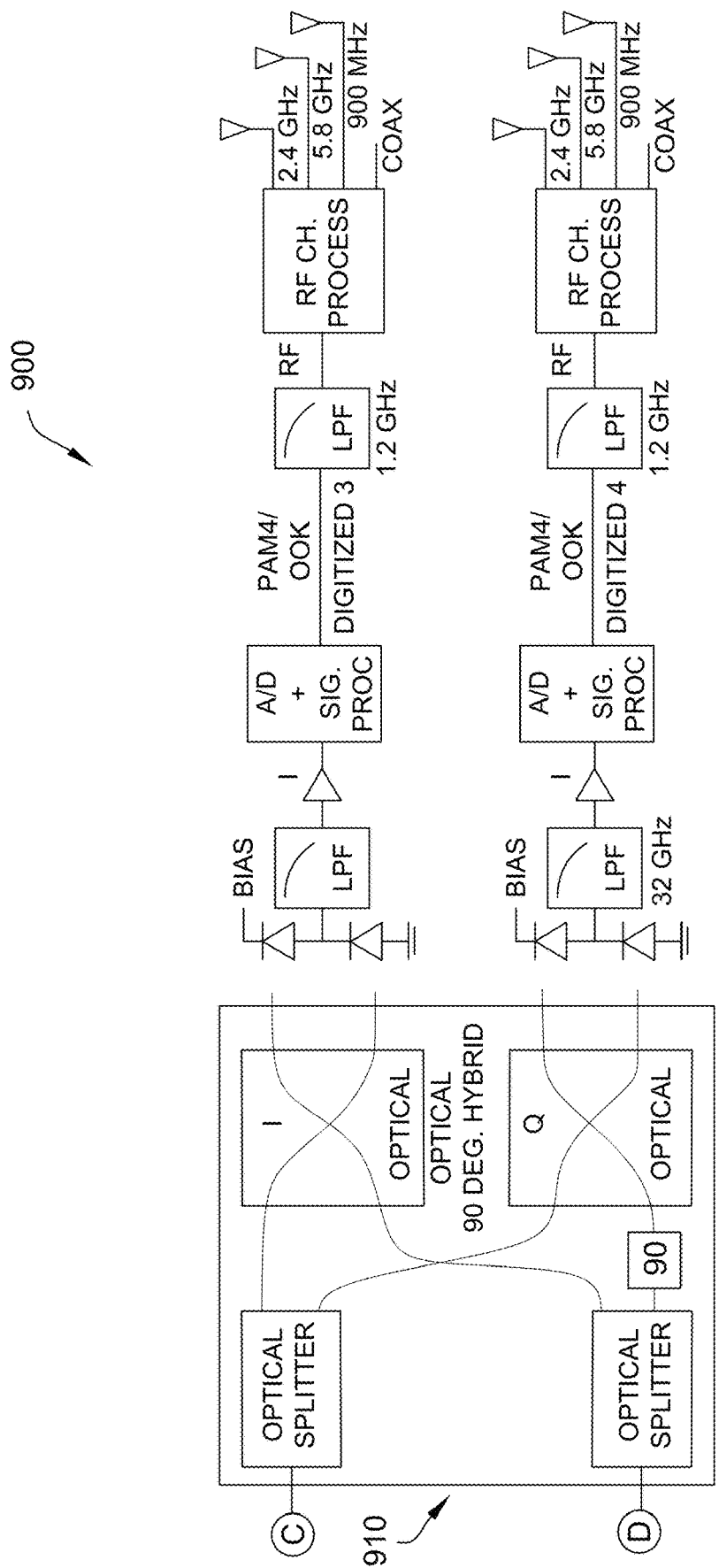

FIGS. 9A-C depict a schematic illustration of a coherent transmission system 900 for an access network environment. In the exemplary embodiment, coherent transmission system 900 provides digitized transport over a coherent optical fiber link. Coherent transmission system 900 may be implemented as a heterodyne, a homodyne, or an intradyne coherent transmission system. For ease of explanation though, the following description focuses on the case of intradyne transmission to leverage signal processing.

In in exemplary operation of coherent transmission system 900, a transmission subsystem 902 transmits digitized signals in quadrature, that is, using I/Q amplitude and phase information, to modulate the signal and then relay the I and Q signals over two polarizations (i.e., X-polarization and Y-polarization) to an upstream polarization beam splitter/combiner (PBS) 904, which simultaneously transports four streams of data (In-phase polarization X, Quadrature polarization X, In-phase polarization Y, Quadrature polarization Y, described further below with respect to FIG. 10) over fiber 906 to a downstream PBS 908. From PBS 908, the digital signal streams of data are received at respective receivers 910, which may further split the four streams of data into the individual phase/quadrature-polarization elements before being output to a client device. Exemplary coherent optical link architectures are described in greater detail in U.S. Pat. No. 9,912,409, issued Mar. 6, 2018, and co-pending U.S. patent application Ser. No. 15/590,464, filed May 9, 2017, the disclosures of both publications being incorporated by reference herein.

FIG. 10 is a graphical illustration depicting simultaneous transport of data streams 1000, 1002, 1004, 1006 generated according to coherent optical link 900, FIGS. 9A-C. That is, data stream 1000 represents the In-phase polarization X, data stream 1002 represents the Quadrature polarization X, data stream 1004 represents the In-phase polarization Y, and data stream 1006 represents the Quadrature polarization Y. Data streams are otherwise substantially similar to data stream 800, FIG. 8, and contain a control channel 1008, a first subset of channels 1010 (DOCSIS channels, in this example), a second subset of channels 1012 (Wi-Fi channels, in this example), and a third subset of channels 1012 (LTE channels, in this example). According to this configuration, the chameleon network node embodiments described herein leverage the nature of coherent optical transport to assemble information into four separate streams, thereby enabling the partition of the digitized transport accordingly.

Figure 11:
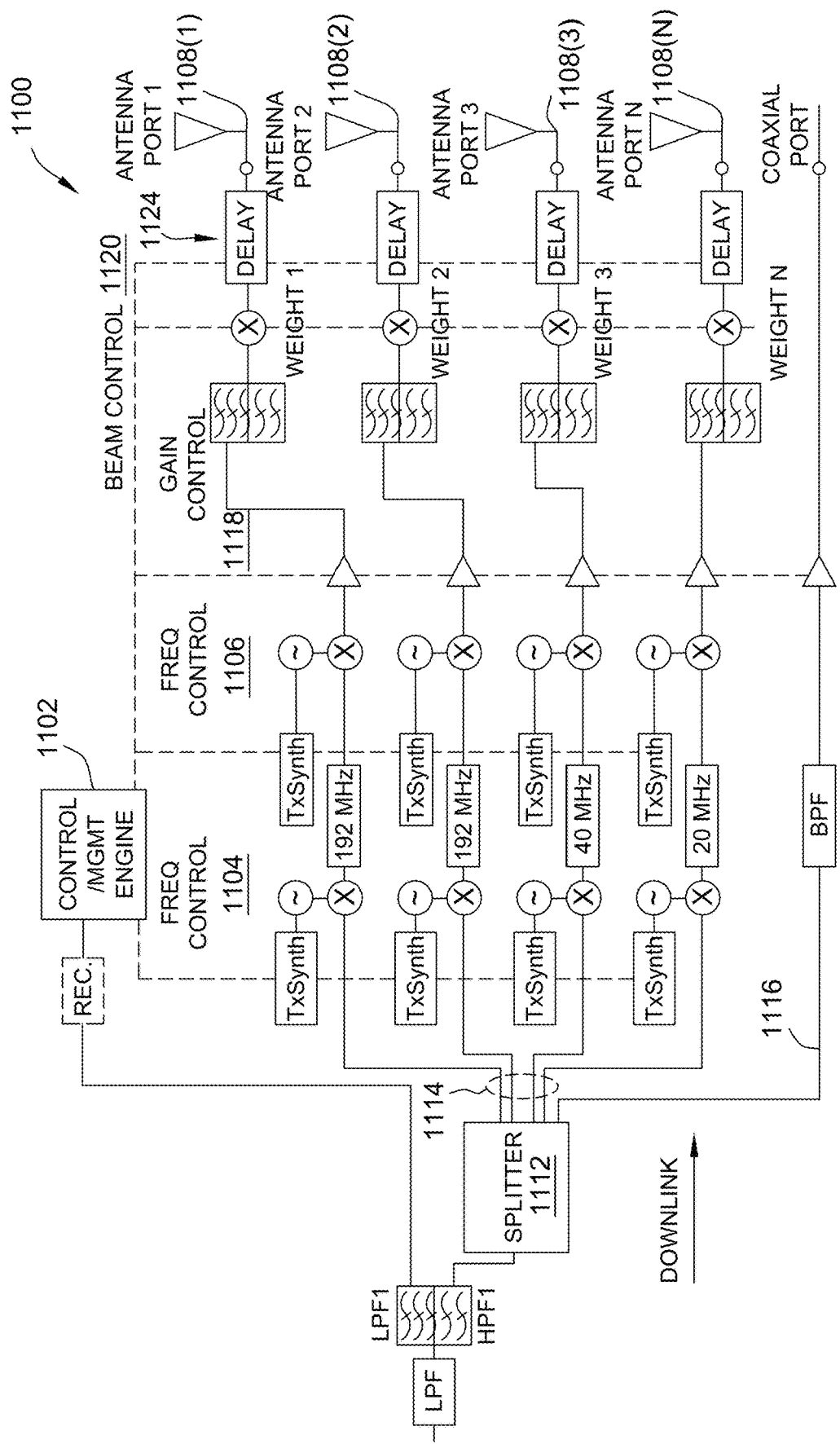
FIG. 11 is a schematic illustration of a channel processor for a downstream data stream, in accordance with an embodiment of the present disclosure.

FIG. 11 is a schematic illustration of a channel processor 1100 for a downstream data stream. In the exemplary embodiments illustrated in FIG. 11, a single channel processor 1100 is configured to process a single downstream data stream. Nevertheless, in the case of a coherent optical link (e.g., coherent transmission system 900, FIG. 9) generating four separate data streams (e.g., data streams 1000, 1002, 1004, 1006, FIG. 10), four separate RF Channel processors may be implemented, respectively. Channel processor 1100 thus functions as a device for managing and manipulating generated RF channels contained within the data streams, such that the channels may be placed at the right frequency (and also amplitude, if desired) in the case of wireless transport. That is, such wireless transport is capable of coordinating delay, amplitude, and phase with other RF streams to enable transmission using, for example, multiple-input-multiple-output (MIMO) and beamforming techniques.

In exemplary operation of channel processor 1100, a control management engine 1102 is configured as a master controller for channel processor 1100, and provides information to the centralized network node (not shown in FIG. 11) such that, at the central location, analysis may be conducted of all such channel processors regarding their respective use.

The RF channel processor has the capability of selecting each particular RF channel contained with the regenerated RF digitize stream and, if desired, up- or down-convert the RF channel to a desired center frequency by first frequency control subprocessors 1104 and second frequency control subprocessors 1106, two further manipulate the RF channel, and direct the RF channel to one or more desired RF ports 1108, 1110 (i.e., antenna ports 1108, coaxial port 1110). In an exemplary embodiment, channel processor 1100 may be configured to further manipulate the RF signal to be split, e.g., by a splitter 1112, into multiple paths 1114, and then separately alter the amplitude, delay, or phase of any one path 1114. In at least one embodiment, channel processor 1100 is configured to enable transmission of a signal that is not subject to up- or down-conversion, as indicated by a path 1116 to coaxial port 1110. This configuration is particularly advantageous in the case of a wideband signal, such as a cable RF signal, that occupies multiple octaves of the transmit spectrum.

In the case of a coherent optical signal having four separate RF digitized streams feeding into a local node (e.g., light local network node 204, FIG. 2), the respective outputs from four separate RF channel processors may be further supported by additional RF combiners (not shown in FIG. 11) configured to aggregate and distribute the output signals from the separate RF channel processors. In at least one embodiment, in the case of four separate RF channel processors being implemented, one such RF channel processor controller is configured to function as the master controller, and the other RF channel processors are configured to function as slave controllers. In this case, the slave controllers provide the control commands for the RF parameters of the signals that are directed to the antenna and/or coaxial ports.

In an exemplary embodiment, channel processor 1100 may be further configured to include one or more of a gain control subprocessor 1118, a beam control subprocessor 1120 (e.g., for beamforming), weights 1122 and delay modules 1124.

Figure 12:
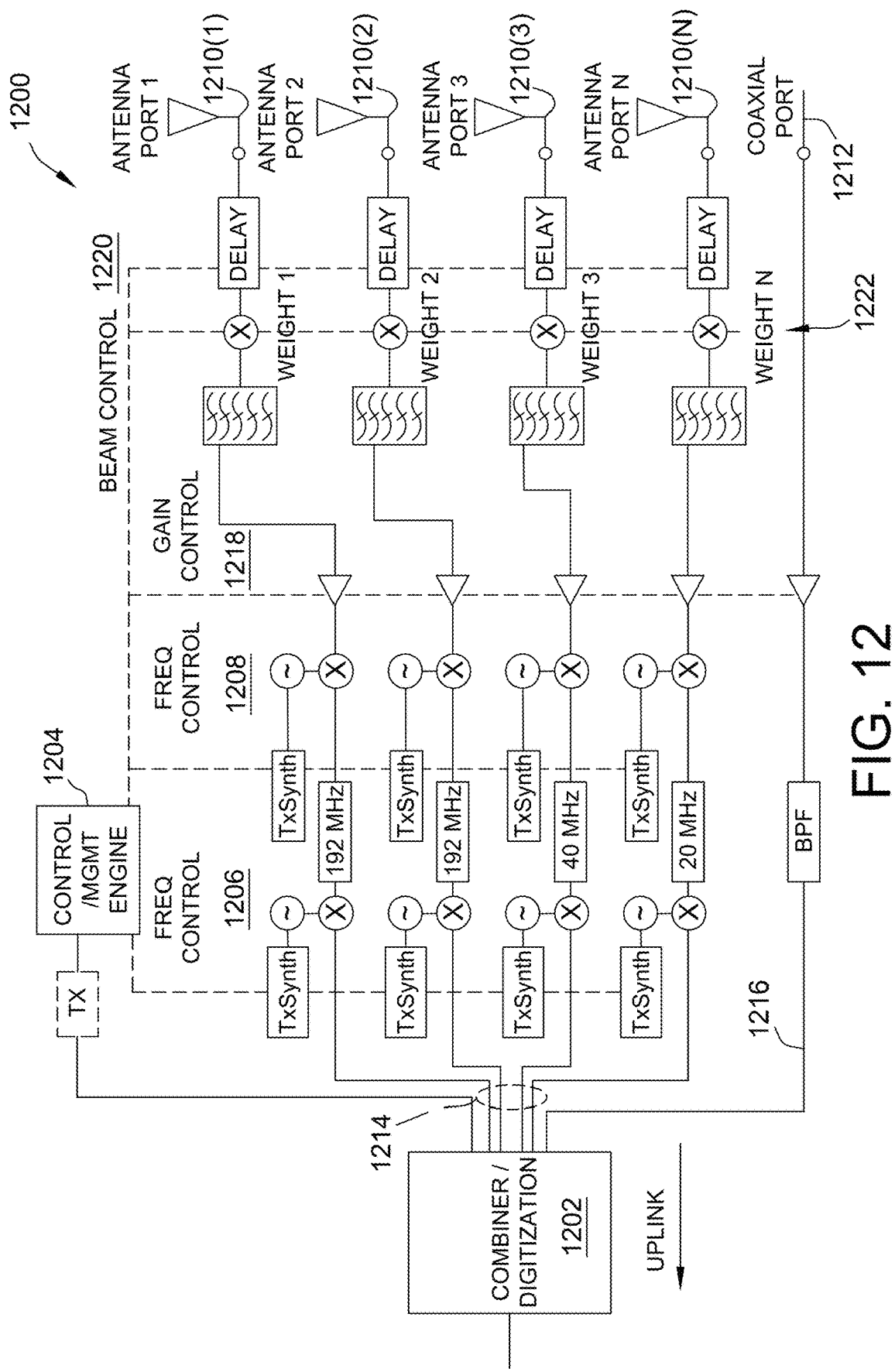
FIG. 12 is a schematic illustration of a channel processor for generating an upstream data stream, in accordance with an embodiment of the present disclosure.

FIG. 12 is a schematic illustration of a channel processor 1200 for generating an upstream data stream. The physical structure of channel processor 1200 is similar channel processor 1100, FIG. 11, except that channel processor 1200 is configured to process the uplink signal in the opposite direction of the downlink signal processed by channel processor 1100. Additionally, for channel processor 1200, digitization occurs at the local node (e.g., light local network node 204, FIG. 2) for the upstream/uplink direction, at a combiner/digitization unit 1202.

In exemplary operation of channel processor 1200, functionality substantially the equivalent to that of channel processor 1100 is performed, but in the reverse direction. That is, channel processor 1200 may include a control management engine 1204, first and second respective frequency control subprocessors 1206, 1208, antenna ports 1210, a coaxial port 1212, multiple conversion paths 1214, a coaxial path 1216, a gain control subprocessor 1218, a beam control subprocessor 1220 weights 1222, and delay modules 1224. In the exemplary embodiment, these several components perform equivalent functions to respective components of channel processor 1100 having the same label. However, in the upstream direction, the assembly of RF channels from paths 1214, 1216 is digitized at combiner/digitization unit 1202, and this is digitized assembly is used to drive the upstream optical transport link (not shown in FIG. 12). In at least one embodiment, the control and management engine is common to both upstream and downstream processing (i.e., engines 1102 and 1204 are the same component). In a similar manner, the beamforming components (e.g., beam control subprocessors 1120, 1220, antenna ports 1210, etc.) of both the downstream and upstream channel processors 1100, 1200 may also common.

As illustrated in the exemplary embodiments depicted herein, a plurality of differing communication protocols (e.g., DOCSIS, Wi-Fi, LTE, MoCA, etc.) may be simultaneously processed by a centralized network node located at the hub or headend of the access network. Particularly with respect to transmissions in the downlink direction, local network nodes in proximity to client/subscriber devices need not process each individual protocol for the particular access network and the client device. Instead, the present embodiments advantageously generate the necessary RF signals at the central network node, and thereby allow the local nodes to operate essentially as relay devices. Because the centralized network node is able to adapt to each type of different transmission protocol encountered from the many local nodes and client devices, the central network node is referred to as a "chameleon" node. The present embodiments therefore realize significant advantages over the conventional techniques that distribute such signal processing requirements inefficiently among the local nodes.

Exemplary embodiments of centralized network node systems and methods are described above in detail, and more particularly, embodiments relating to beacon detection system configuration and operation. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An access network, comprising:
   a first local network node configured to serve one or more first client devices according to a first network protocol;
   a second local network node configured to serve one or more second client devices according to a second network protocol different than the first network protocol; and
   a hub in operable communication with the first and second local network nodes over respective transport media, the hub containing a centralized network node configured to generate a first digitized radio frequency (RF) stream to the first local network node and a second digitized RF stream to the second local network node, wherein the first digitized RF stream corresponds to the first network protocol and the second digitized RF stream corresponds to the second network protocol.

2. The access network of claim 1, wherein the centralized network node is further configured to implement at least one of network function virtualization and software defined radio to generate the first and second digitized RF streams.

3. The access network of claim 2, wherein the centralized network node comprises at least one of a network function virtualization layer, a media access control (MAC) layer, a physical (PHY) layer, and a digitization layer.

4. The access network of claim 3, wherein the MAC layer is a software defined MAC layer.

5. The access network of claim 4, wherein at least one of the first and second network protocols corresponds to an optical network comprising one or more of a WAN, an Ethernet passive optical network (EPON), and a gigabit Ethernet network (GEth).

6. The access network of claim 3, wherein the PHY layer is an SDR PHY layer.

7. The access network of claim 6, wherein at least one of the first and second network protocols comprises a data over cable service interface specification (DOCSIS), long term evolution (LTE), multimedia over coaxial alliance (MoCA), Wi-Fi, and 5G.

8. The access network of claim 3, wherein the digitization layer comprises an analog-to-digital converter.

9. The access network of claim 1, comprising an optical communication system, and wherein the transport media comprise optical fibers.

10. The access network of claim 9, wherein the optical communication system comprises a radio frequency over glass (RFoG) network.

11. The access network of claim 9, wherein the optical communication system comprises a hybrid fiber coaxial (HFC) network.

12. The access network of claim 9, wherein the optical communication system comprises a point-to-multipoint network.

13. The access network of claim 9, wherein the optical communication system further comprises in at least one cellular base station.

14. The access network of claim 9, wherein the optical communication system comprises a passive optical network configured to implement coherent dense wavelength division multiplexing.

15. The access network of claim 14, wherein the first digitized RF stream comprises one of a quadrature signal transmission having at least two polarizations, a quadrature component, and then in-phase component.

16. The access network of claim 1, wherein the first digitized RF stream comprises a control channel and a set of frequency-multiplexed channels.

17. The access network of claim 16, wherein the set of frequency-multiplexed channels includes a first subset of channels and a second subset of channels different from the first subset of channels.

18. The access network of claim 17, wherein the first subset of channels comprises a plurality of (i) DOCSIS channels, (ii) LTE channels, or (iii) Wi-Fi channels.

19. The access network of claim 1, further comprising a multiple-input-multiple-output (MIMO) antenna system in operable communication with at least one of an upstream channel processor and a downstream channel processor.

20. A network node for an access communication network, the network node comprising:
 a network function virtualization layer;
 a media access control layer;
 a physical layer;
 a digitization layer; and
 a plurality of digital optical interfaces in operable communication with a plurality of optical fibers of the access communication network,
 wherein the network node is configured to generate digitized RF signal streams for transport over the plurality of optical fibers to a respective plurality of distributed nodes each disposed proximate to one or more subscribers of the access communication network.

* * * * *